United States Patent [19]

Hori et al.

[11] 4,391,955

[45] Jul. 5, 1983

[54] PROCESS FOR CROSSLINKING POLYCARBONATE RESINS

[75] Inventors: Hisako Hori, Tokyo; Nobu Kitamura, Hiratsuka; Isao Shirahata, Chigasaki; Nobuyuki Nakamura, Fujisawa, all of Japan

[73] Assignee: The Furukawa Electric Co., Ltd., Tokyo, Japan

[21] Appl. No.: 340,973

[22] Filed: Jan. 20, 1982

[30] Foreign Application Priority Data

Feb. 5, 1981 [JP] Japan .................. 56-16018

[51] Int. Cl.³ .......................... C08L 69/00
[52] U.S. Cl. ...................... 525/462; 528/483; 528/485
[58] Field of Search ............. 525/462; 528/483, 485, 528/486, 196

[56] References Cited

U.S. PATENT DOCUMENTS

3,021,305  2/1962  Goldberg .................. 525/462

FOREIGN PATENT DOCUMENTS

50-44292  4/1975  Japan.

OTHER PUBLICATIONS

Nature, Apr. 24, 1965 (No. 4982), p. 397.
Journal of Polymer Science, Part A, vol. 2, pp. 2859–2873 (1964).
Influences of Pigment on Deterioration of Plastic Material (1966), Kobunshi Kagaku, 23(259), 792(1966).

Primary Examiner—Theodore E. Pertilla
Attorney, Agent, or Firm—Frishauf, Holtz, Goodman & Woodward

[57] ABSTRACT

A process for crosslinking a polycarbonate resin involves heating the polycarbonate resin in the presence of an organic copper compound at a temperature higher than the glass transition point of the polycarbonate resin.

20 Claims, 1 Drawing Figure

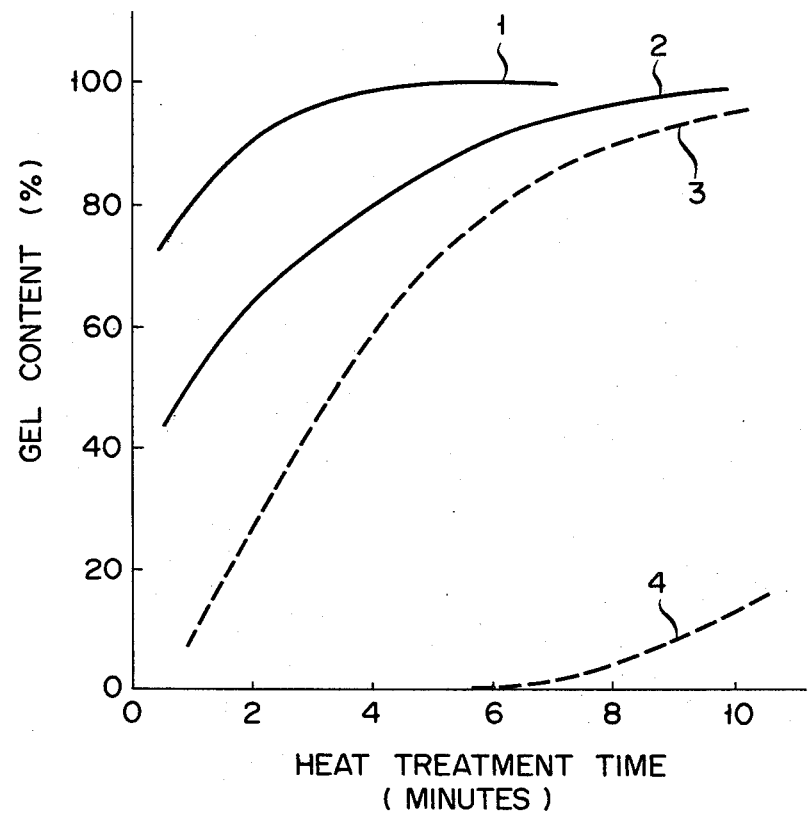

PROCESS FOR CROSSLINKING POLYCARBONATE RESINS

The present invention relates to a process for preparing a crosslinked polycarbonate resin with superior performance by more efficiently crosslinking the polycarbonate resin.

Polycarbonate resins have been extensively used as engineering plastics because they possess favorable physical, chemical and electrical properties.

The polycarbonate resins, however, are easily soluble in certain organic solvents such as aromatic or chlorinated hydrocarbons so that their use is limited for applications in which they might come into contact with such organic solvents. Being thermoplastic and low in crystallinity, the polycarbonate resins cannot be used at temperatures above their glass transition points.

In order to overcome these drawbacks inherent in the conventional polycarbonate resins, a process has been proposed in which they are crosslinked by heating at temperatures ranging from about 200° to 600° C. in the presence of oxygen [U.S. Pat. No. 3,021,305, (Japanese Patent Publication (KOKOKU) No. 35-14947] Such crosslinked polycarbonate resins are known to be substantially improved in solvent resistance, chemical resistance and heat resistance as compared with non-crosslinked polycarbonate resins.

The mechanism of crosslinking the polycarbonate resins by application of heat, though unclear in many points, may be considered comprising a depolymerization step involving the generation of free radicals resulting from thermal depolymerization by the action of a trace amount of water or hydroxy compounds present in the resin, and a recoupling step of these free radicals. It is considered that, in the course of transition from the depolymerization process to the recoupling step, low molecular weight materials, such as $CO_2$ produced by the depolymerization, volatilize out of the system, with a resultant decrease in weight, which changes the resin into a structure rich in aromatic rings and resistant to heat. It is also considered that the crosslinking is proceeded by condensation. It is further considered that a thermal oxidative reaction may serve to promote the depolymerization step mentioned hereinabove in the presence of oxygen, resulting in an increase in the speed of crosslinking.

Although the thermal crosslinking of polycarbonate resins is considered to proceed according to the mechanism as mentioned hereinabove, conventional polycarbonate resins require a long time for the initiation of the depolymerization which is the first step in a series of crosslinking reactions. Even if the reaction is carried out at high temperatures ranging from 350° to 500° C., the overall crosslinking of the resin requires a long time.

The process for crosslinking a polycarbonate resin according to the present invention comprises heating the polycarbonate resin at a temperature higher than the glass transition point thereof in the presence of an organic copper compound.

The present invention can be more fully understood from the following detailed description when taken in conjunction with the accompanying drawing, in which the FIGURE shows a graph illustrating the relationship between heat treatment time with gel content in Example 1.

As a result of extensive study to increase the thermal crosslinking speed of polycarbonate resin, it has been found that the presence of an organic copper compound in the reaction system during the thermal crosslinking of the polycarbonate resin can increase the rate of crosslinking to a remarkable extent. Although there are some unknown points in the role of the organic copper compound in the thermal crosslinking of the polycarbonate resin, the copper present in the reaction system is considered acting as a catalyst for both depolymerization and recoupling in a series of crosslinking reactions as hereinabove referred to, whereby the crosslinking progresses rapidly.

As a catalyst for the oxidative decomposition of the polycarbonate resin, zinc stearate is known (J. Polymer Sci., 2, 2859 (1964)). It is also reported in Kobunshi Kagaku, 23 (259), 792(1966) that tests of adding pigments to the polycarbonate resin indicate that copper, lead or cadmium as a metal have the greatest oxidation-promoting effect and remarkably reduce the melt viscosity of the resin.

From these reports, we have anticipated that a variety of metals including copper will function as a catalyst for thermal crosslinking of a polycarbonate resin.

Accordingly, we carried out a test in which a resin composition of a polycarbonate resin compound with a metal salt of an organic acid or a chelate compound of metal was heated for a given period of time at temperatures above its glass transition point. As a consequence, for the resin composition containing a compound of a metal other than copper, application of heat caused the gel content of the resin to amount finally to 90% but a decrease in weight of the resin resulting from the application of heat occurred more rapidly than when heating a composition containing no metallic compound. At this time, the decrease in weight of the resin reached 40% or more and, in some cases, 80% or more. Thus, it has been recognized that the effect of adding a compound of a metal other than copper was remarkable merely on the oxidative decomposition of the resin. On the other hand, when an organic copper compound is used, it serves as a catalyst in both the depolymerization step and the recoupling step, whereby an undesirable decrease in weight of the resin is prevented and the formation of the crosslinked product is promoted efficiently. Thus, it has been found that the organic copper compound possesses a specific function which is not found in other metallic compounds. It is further found that, when the organic copper compound is added, the rate of gel formation is promoted remarkably as compared with the resin containing no organic copper compound and that a decrease in weight of the resin by application of heat is far less than the decrease in weight of the resin containing no organic copper compound at the time of reaching the identical gel content.

The organic copper compound to be used in accordance with the present invention may be desirably one that has compatibility with the polycarbonate resin and may include, for example, copper salts of organic acids such as copper acetate, copper naphthenate, copper oleate, copper stearate, copper dimethyl dithiocarbamate or the like, a copper chelate compound such as copper acetylacetonate or the like, and a copper salt of 2-mercaptobenzimidazole which is used as an antioxidant. As the organic copper compound is favorable in compatibility with the polycarbonate resin, it is considered that most of copper contained in the organic copper compound effectively acts on the crosslinking of the resin. The amount of copper effectively acting on the crosslinking will hereinafter be referred to as "effective amount of copper". A copper metal or an inorganic copper compound, which lacks compatibility with the polycarbonate resin, cannot function as a catalyst for crosslinking. However, if these compounds coexist with an organic compound such as an organic acid in the resin and are converted into organic copper compounds compatible with the polycarbonate resin, the resulting organic copper compound can act as a catalyst in the crosslinking of the resin. Accordingly, the organic copper compound of the present invention may also include organic copper compounds formed in such a manner.

The amount of the organic copper compound to be added to the polycarbonate resin may be so determined that the copper content thereof, as the effective amount of copper, comes within a preferred range. The effective amount of copper should be 0.02% or more by weight based on the polycarbonate resin, the upper limit being preferably 2% by weight based on the polycarbonate resin in order not to affect adversely the physical properties such as mechanical strength of the resin composition. Furthermore, the most preferable range of the effective amount of copper is from 0.05 to 1% by weight.

In accordance with the present invention, procedures for introducing the organic copper compound into the polycarbonate resin may include, for example, a procedure for preparing a resin composition by kneading the polycarbonate resin and the organic copper compound in the molten state; a procedure for preparing a solution of the polycarbonate resin and the organic copper compound in a solvent; and a procedure for introducing the organic copper compound into the polycarbonate resin by impregnation by means of a solvent.

By the term "polycarbonate resin" is meant herein a polycarbonate prepared from a dihydroxy diphenyl alkane as a structural unit by dehydrochlorination reaction with phosgene or by ester interchange with diphenyl carbonate, and a polymer composition containing said polycarbonate as a major component. The dihydroxy diphenyl alkane may include, for example,
bis(4-hydroxyphenyl)methane;
1,1-bis(4-hydroxyphenyl)ethane;
2,2-bis(4-hydroxyphenyl)propane;
2,2-bis(3-methyl-4-hydroxyphenyl)propane;
2,2-bis(4-hydroxy-3,5-dichlorophenyl)propane;
1,1-bis(4-hydroxyphenyl)butane;
2,2-bis(4-hydroxyphenyl)butane;
1,1-bis(4-hydroxyphenyl)isobutane;
2,2-bis(4-hydroxyphenyl)pentane;
2,2-bis(4-hydroxyphenyl)-4-methylpentane;
1,1-bis(4-hydroxyphenyl)cyclohexane or the like.

When the organic copper compound is present in the reaction system, crosslinking of the polycarbonate resin by application of heat under the present invention is accomplished with a sufficiently practical effect even in a situation where no oxygen is present in the reaction system, such as inside a thick molded product, in vacuo, or in an atmosphere of an inert gas such as nitrogen gas. When oxygen is present in the reaction system, however, it is the most desirable condition because the thermal oxidative decomposition reaction also occurs with the thermal decomposition reaction in the depolymerization step which is the first step of the crosslinking reaction, and as a result the crosslinking reaction is accelerated remarkably.

For introducing oxygen, heat treatment may be carried out in an oxygen-containing gas, generally in air.

Furthermore, as a higher oxygen partial pressure in an oxygen-containing atmosphere than the oxygen partial pressure of air in a normal state can enhance the diffusion velocity of oxygen and the concentration of oxygen in the resin, improvements in the crosslinking rate and crosslinking density can be accomplished. Therefore, the high oxygen partial pressure is of great significance from an industrial point of view.

In particular, when the oxygen partial pressure is 230 mmHg or higher, the effect is remarkable. The upper limit of the oxygen partial pressure, though not particularly restricted, may be about 600 mmHg from the viewpoint of safety.

In the present invention, heating temperature may be equal to or higher than the glass transition point of the polycarbonate resin to be used. When fast crosslinking is required, heating at temperatures equal to or higher than the softening point of the resin, more specifically, at 250° C. or higher, is desirable. The upper limit on the heating temperature may be preferably about 500° C. in order to prevent a random thermal decomposition reaction of the resin used and to avoid the degradation in the physical properties of the resin.

The crosslinked polycarbonate resin obtainable by the process of the present invention is extremely useful on an industrial basis because its physical properties such as heat resistance, solvent resistance and mechanical strength are improved to a remarkable extent. Good examples of application of the present invention are insulated wires of good quality made by extruding molten polycarbonate resin composition containing an organic copper compound on a linear electric conductor to form a coating thereon in a thickness of about several tens of microns and then crosslinking the coating by heat while passing it in a heating furnace; a crosslinked polycarbonate film made by extruding the resin composition in a film form on substrate such as a belt of a metal foil made of stainless steel or the like or in a heat-resistant plastic film such as polyimide film, polyoxadiazole film or the like, heating them at temperatures higher than the melting point of the resin, and then removing the crosslinked film of polycarbonate from the substrate; a shaped article coated with a crosslinked polycarbonate made by coating a molded product of a desired shape with the resin composition by means of the hot melt coating method, the powder coating method, the solvent type coating method or the like and then heating the coating for crosslinking; and a crosslinked polycarbonate resin molded product made by injection molding said resin composition into a mold of a desired shape and then heating it for a determined period of time.

According to the present invention, it is possible to control the degree of crosslinking of the polycarbonate resin within a suitable range for various applications according to the desired characteristics of the resultant product. Improvements in thermal, chemical and mechanical properties of the resin can be accomplished generally by setting the gel content of the resin 20% or more by weight.

Although the gel content is employed to indicate the degree of crosslinking of the resin, it varies with measuring conditions such as the kind of a solvent used, temperature and time. The gel content referred to in the present invention is expressed in percentage by weight of undissolved residues against the original weight of a resin which is immersed in meta-cresol at 90° C. for 5 hours.

Table 1 compares the gel contents of the same resin sample immersed in chloroform at 62° C. (boiling point) for 5 hours, in dioxane at 90° C. for 5 hours, and in meta-cresol at 90° C. for 5 hours.

TABLE 1

| Comparison of Gel content (% by weight) | | |
| --- | --- | --- |
| meta-Cresol 90° C. × 5 H | Chloroform 62° C. × 5 H | Dioxane 90° C. × 5 H |
| 1 | 26 | 15 |
| 10 | 41 | 30 |
| 20 | 53 | 43 |
| 30 | 63 | 54 |
| 40 | 71 | 65 |
| 50 | 77 | 73 |
| 60 | 82 | 79 |
| 70 | 88 | 85 |
| 80 | 93 | 91 |
| 90 | 97 | 95 |

The present invention will now be described in more detail by way of examples.

EXAMPLE 1

Ten grams of poly(2,2-bis(4-hydroxyphenyl)propane carbonate) resin (trade name: Panlite K-1300; manufactured by Teijin Limited) (hereinafter referred to as PC), obtained from 2,2-bis(4-hydroxyphenyl)propane and phosgene, and 0.1 g of copper acetylacetonate (effective amount of copper being 0.24% by weight based on PC) were dissolved in a solvent comprising dichloromethane and dichloroethane to give a resin solution having 20% by weight of solid content. The resultant solution was then coated on a 50μ copper foil and dried to make a 30μ thick coating film. This film is referred to as Sample A.

Separately, PC alone was dissolved in a mixed solvent comprising dichloromethane and dichloroethane to make a resin solution having 20% by weight of solid content, and the resin solution was coated on a 50μ thick copper foil and dried to make a 30μ thick coating film. The film is referred to as Sample B.

Sample A was placed with its copper foil side down on a stainless steel plate in an electric furnace in which the temperature of the air was 400° C. (1) and 350° C. (2) for given period of time and after the heat treatment immediately air-cooled. Sample B was likewise treated at temperatures of 400° C. (3) and 350° C. (4), respectively. The gel content of the test samples after the heat treatment were then measured. FIGURE shows the relationship of the gel content with the heat treatment time. As is evident from the FIGURE in each case of heat treatment at 400° C. (1 and 3) and at 350° C. (2 and 4), gel formation was much faster in Sample A containing copper acetylacetonate than in Sample B with no copper acetylacetonate added thereto. It was further found that while Sample B showed no gel formation in 5 minutes of heat treatment at 350° C. (4), Sample A showed gel formation even within 1 minute of heat treatment at 400° C. (1). Thus, it was found that the addition of an organic copper compound also has a remarkable effect of lowering the temperature at which the crosslinking reaction is initiated.

Table 2 shows the properties of Samples A and B film before and after the heat treatment.

TABLE 2

| | Sample | | | |
| --- | --- | --- | --- | --- |
| | Sample (A) | | Sample (B) | |
| | Heat treatment | | | |
| Items | Not performed | 400° C. 2 min | Not performed | 400° C. 8 min |
| Gel content (%) | 0 | 90.5 | 0 | 90.1 |
| Pencil hardness of coating | 2H | 7H | 3H | 7H |
| Chemical resistance; after immersion at room temperature for 24 hrs (pencil hardness) | | | | |
| NaOH (3%) | 2H | 6H | 3H | 6H |
| Sulfuric Acid (specific gravity: 1.2) | 2H | 6H | 3H | 6H |
| Solvent resistance; after immersion in xylene at 60° C. for 30 minutes (pencil hardness) | 6B or lower | 2H | 6B or lower | 2H |
| Cut-through temperature (°C.) | 165 | 290 | 196 | 291 |
| Tensile strength (Kg/mm$^2$) | 4.65 | 5.60 | 4.80 | 5.60 |

Note 1: The test for cut-through temperatures was carried out with reference to a method specified by JIS (Japanese Industrial Standard) C-3003 13 (Anti-softening test).

A steel ball having a smooth surface and a diameter of 1.6 mm, which is used for the rectangular wire test, was placed on the coating of a sample (coating on a copper foil) having a size of about 1 cm × 5 cm and then placed in a thermoplastic chamber with a load of 1 kg applied thereon. With an AC voltage of 100 V applied across the copper foil of the sample and the steel ball, the temperature was raised at a rate of about 2° C. per minute so as to measure the temperature at which the short circuit occurred.

Note 2: A coating in the form of a film was obtained by removing the copper foil from the sample by means of etching so as to prepare a test specimen having a width of 10 mm and a length of 100 mm. The tensile strength of the test specimen was measured at a chuck distance of 5 mm and a tension speed of 100 mm per minute with an Instron type tensile strength testing machine.

It is evident from Table 2 that, although the film of the polycarbonate resin composition blended with the organic copper compound is somewhat inferior in properties before crosslinking to the film of polycarbonate resin alone, the two films exhibit very favorable properties when crosslinked to a similar extent, indicating a remarkable properties-improving effect of crosslinking. Furthermore, the process of the present invention is very effective in improving the speed of crosslinking, so that it is of great significance from an industrial point of view.

EXAMPLES 2 & 3 AND COMPARATIVE
EXAMPLES 1 through 5

In order to compare the effect of reacting the organic copper compound on the crosslinking of polycarbonate resin with other organic metallic compounds, the organic metallic compounds indicated in Table 3 were each added to the same polycarbonate resin as in Example 1 at a rate of $7.5 \times 10^{-3}$ g ions against 100 g of PC, and a films, each having a thickness of 30μ were formed therefrom on a 50μ thick copper foil to serve as samples.

Each of the samples was heat-treated for 7 minutes in an electric furnace with an air atmosphere at a temperature of 350° C. and then air-cooled immediately thereafter. Measurement was taken of the weight of the samples before and after the heat treatment and their gel content after the heat treatment, and the weight of the copper foils alone. Then the gel content, gel yield and weight decrease percentage were calculated by the following equations:

$$\text{Gel Content (\%)} = \frac{\text{Residues of coating film undissolved in meta-cresol (g)}}{\text{Weight of coating film after heat treatment (g)}} \times 100$$

$$\text{Gel Yield (\%)} = \frac{\text{Residues of coating film undissolved in meta-cresol (g)}}{\text{Weight of coating film before heat treatment (g)}} \times 100$$

$$\text{Weight Decrease (\%)} = \frac{\text{Weight of coating before heat treatment (g)} - \text{weight of coating film after heat treatment (g)}}{\text{Weight of coating film before heat treatment (g)}} \times 100$$

The results are shown in Table 3.

In Comparative Examples 4 and 5, the samples were prepared without the addition of the organic metallic compounds and were heat-treated at varied temperatures. The results are shown in Table 3.

In Example 3, the same sample as used in Example 2 was treated at 400° C. The results are shown in Table 3.

the crosslinking speed as well as on improvement in gel yield.

EXAMPLE 4

A reaction vessel was charged with 48.4 g of 2,2-bis(4-hydroxyphenyl)butane, 33.2 g of dry pyridine and 480 cc of chlorobenzene; 19.8 g of phosgene was blown in small portions thereinto at a temperature of about 30° C. The resulting product was allowed to precipitate with hexane and then washed well with hexane to give poly(2,2-bis(4-hydroxyphenyl)butane carbonate) resin having an inherent viscosity of 0.48.

10 g of the resultant polycarbonate resin and 0.08 g of copper acetylacetonate (the amount of copper being 0.19% by weight based on the polycarbonate resin) were dissolved in a mixed solvent of dichloromethane and dichloroethane to give a resin solution having about 20% by weight of solid content. The resulting solution was then coated on a stainless steel foil having a thickness of 50μ and dried to make a 40μ thick coating film as a sample.

The resin film so made was placed on a stainless steel plate in an electric furnace having an atmosphere of the oxygen partial pressure of 460 mmHg and heated for 1 minute and immediately air-cooled. The electric furnace had a volume of 10 l and was controlled at 380° C. with a constant flow at 30 l/min of an oxygen-nitrogen mixture, preadjusted so as to have an oxygen partial pressure of 460 mmHg, from the bottom of the furnace. The gel content of the film then measured was 84.5%. For comparison, the sample resin coating thus prepared hereinabove was heated for 1 minute on a stainless steel plate in an electric furnace having an air atmosphere at a temperature of 380° C. (oxygen partial pressure being

TABLE 3

|  | Example 2 | Example 3 | Comparative Example 1 | Comparative Example 2 | Comparative Example 3 | Comparative Example 4 | Comparative Example 5 |
|---|---|---|---|---|---|---|---|
| Organic metal compound (based on 100 g of PC) | Copper naphthenate (2.4 g) | Copper naphthenate (2.4 g) | Lead naphthenate (2.6 g) | Manganese naphthenate (2.1 g) | Zinc naphthenate (2.5 g) | Not added | Not added |
| Heat treatment | 350° C. 7 min | 400° C. 2 min | 350° C. 7 min | 350° C. 7 min | 350° C. 7 min | 350° C. 7 min | 400° C. 9 min |
| Outer appearance | Normal | Normal | Poor | Poor | Poor | Normal | Normal |
| Flexibility | Normal | Normal | No flexibility | No flexibility | No flexibility | Normal | Normal |
| Gel Content (%) | 93.6 | 93.0 | 100 | 98.4 | 60.0 | 2.1 | 92.5 |
| Gel yield (%) | 83.0 | 81.8 | 19.8 | 56.9 | 8.1 | 2.0 | 78.2 |
| Weight decrease | 11.3 | 12.0 | 80.0 | 42.2 | 86.5 | 4.7 | 15.5 |

The results shown in Table 3 indicate, as have been described hereinabove, that the polycarbonate resins of Comparative Examples 1 through 3 containing the organic metallic compounds other than the organic copper compound were much greater in weight decrease during the heat treatment and therefore much lower in gel yield than that of Example 2 containing copper naphthenate, so that the resultant crosslinked product could not be used in practice. It was also found from a comparision of the results of Examples 2 and 3 with those of Comparative Examples 4 and 5 that the addition of copper nathphenate has a remarkable effect on about 152 mmHg) and air-cooled. The gel content of the film then measured was 52.8%.

COMPARATIVE EXAMPLE 6

A mixture of a polycarbonate resin similar to that used in Example 1 and copper acetylacetonate (at the ratio of 1 g/100 g of PC) were kneaded at 305° C. with a biaxial extruder. The resultant mixture was applied over on a copper wire having a diameter of 1.0 mm by an extruder with its cylinder and die kept at 305° C. so as to make a coating with a thickness of 30 to 32μ. The resin coating of the insulating wire so obtained had a gel content of 0%.

EXAMPLE 5

The insulated wire obtained in Comparative Example 6 was passed, for crosslinking, through an air atmosphere in a 5 m-long furnace kept at a temperature of 430° C. at a rate of 5 m/min. The gel content measured of the resulting insulating coating removed from the insulated wire was 21.9%.

EXAMPLE 6

The insulated wire obtained in Comparative Example 6 was crosslinked by heat under the same condition as in Example 5 except that it was passed through the furnace at the rate of 2.5 m/min. The coating of the resulting insulated wire had a gel content of 90.6%.

EXAMPLE 7

The insulated wire obtained in Comparative Example 6 was crosslinked by heat under the same condition as in Example 5 except that it was passed through a furnace in which was introduced a mixture of oxygen and nitrogen, previously so adjusted as to have an oxygen partial pressure of 300 mmHg. The coating of the resulting insulated wire had a gel content of 80.5%.

The properties of the insulated wires obtained in Examples 5 through 7 and in Comparative Example 6 were measured in accordance with JIS C 3003. The results are shown in Table 4.

TABLE 4

| | Example 5 | Example 6 | Example 7 | Comparative Example 6 |
|---|---|---|---|---|
| Atmosphere in furnace | Air | Air | Oxygen partial pressure 300 mmHg | — |
| Heat treatment speed (m/min) | 5 | 2.5 | 5 | — |
| Gel content (%) | 21.9 | 90.6 | 80.5 | 0 |
| Flexibility (wound around diameter of wire) | Good | Good | Good | Good |
| Resistance to deterioration (wound after 200° C. × 6 hrs) | 1 × diameter of wire Good | 1 × diameter of wire Good | 1 × diameter of wire Good | 1 × diameter of wire Good |
| Solvent resistance; after immersion in xylene at 60° C. for 0.5 hour (pencil hardness) | HB | 3H | 2H | 6B or lower |
| Chemical resistance; after immersion at room temperature for 24 hours (pencil hardness) | | | | |
| $H_2SO_4$ (specific gravity: 1.2) | 7H | 6H | 6H | 2H |
| NaOH (1%) | 7H | 6H | 7H | 2H |
| Abrasion resistance (times) | 28 | 25 | 24 | 9 |
| Dielectric breakdown voltage (KV) | 4.3 | 4.9 | 4.8 | 4.1 |
| Cut-through temperature (°C.) | 227 | 305 | 246 | 180 |

EXAMPLE 8

Samples A and B as used in Example 1 were heated for two minutes on a stainless steel plate in the same 10-liter electric furnace as used in Example 4 in which the temperature was controlled at 400° C. while nitrogen was kept flowing from its bottom at a rate of 30 l/min. The samples were then immediately cooled by air. Their gel contents after the heat treatment were 50.2% for Sample A (with the copper acetylacetonate added) and 5.0% for Sample B (with no copper acetylacetonate added).

It was thus found that copper acetylacetonate allowed the crosslinking of the polycarbonate resin even in the absence of oxygen, indicating that the copper compound played an extremely great role in the crosslinking of polycarbonate resins.

What we claim is:

1. A process for crosslinking a polycarbonate resin comprising heating a mixture comprising (1) a polycarbonate resin selected from the group consisting of (i) polycarbonate obtained (a) by the dehydrochlorination of a dihydroxyphenyl alkane with phosgene, or (b) by an ester interchange of a dihydroxyphenyl alkane with diphenyl carbonate, and (ii) a polymer composition containing said polycarbonate as a major component thereof, at a temperature higher than the glass transition point of said polycarbonate resin and (2) an organic copper compound which is compatible with said polycarbonate resin, the amount of said organic copper compound being sufficient to catalyze the crosslinking of said polycarbonate resin.

2. A process according to claim 1, wherein the organic copper compound is a compound selected from the group consisting of a copper salt of an organic acid and a copper chelate compound.

3. A process according to claim 1, wherein the organic copper compound is copper acetylacetonate.

4. A process according to claim 1, wherein the organic copper compound is present in an effective amount of copper of at least 0.02% by weight based on the polycarbonate resin.

5. A process according to claim 1, wherein the organic copper compound is present in an effective amount of copper of 0.05 to 1% by weight based on the polycarbonate resin.

6. A process according to claim 1, wherein the organic copper compound is added to the polycarbonate resin by the melt kneading method.

7. A process according to claim 1, wherein the organic copper compound is added to the polycarbonate 8. A process according to claim 1, wherein said heating is carried out in an oxygen-containing gas.

9. A process according to claim 1, wherein said heating is carried out in a gas having an oxygen partial pressure higher than the oxygen partial pressure of air.

10. A process according to claim 1, wherein said heating is carried out in an atmosphere having a temperature of 250° to 500° C.

11. A process according to claim 1, wherein the polycarbonate resin is heated in the presence of the organic copper compound until the weight ratio of undissolved residues to a sample weight is at least 20% by weight when the sample is heated in meta-cresol at 90° C. for 5 hours.

12. A process according to claim 1, wherein said organic copper compound is selected from the group consisting of copper acetate, copper naphthenate, copper oleate, copper stearate, copper dimethyl dithiocarbamate, copper acetylacetonate, and the copper salt of 2-mercaptobenzimidazole; and said dihydroxyphenyl alkane is selected from the group consisting of bis(4-hydroxyphenyl)methane, 1,1-bis(4-hydroxyphenyl)ethane, 2,2-bis(4-hydroxyphenyl)propane, 2,2-bis(3-methyl-4-hydroxyphenyl)propane, 2,2-bis(4-hydroxy-3,5-dichlorophenyl)propane, 1,1-bis(4-hydroxyphenyl)butane, 2,2-bis(4-hydroxyphenyl)butane, 1,1-bis(4-hydroxyphenyl)isobutane, 2,2-bis(4-hydroxyphenyl)pentane, 2,2-bis(4-hydroxyphenyl)-4-methylpentane, and 1,1-bis(4-hydroxyphenyl)cyclohexane.

13. A process according to claim 1, wherein said organic copper compound is in an effective amount of copper between 0.05 and 1% by weight based on the polycarbonate resin and wherein said heating is carried out in an atmosphere having an oxygen partial pressure higher than the oxygen partial pressure of air and at a temperature of between 250° and 500° C.

14. A process according to claim 2, wherein said organic copper compound is in an effective amount of copper between 0.05 and 1% by weight based on the polycarbonate resin and wherein said heating is carried out in an atmosphere having an oxygen partial pressure higher than the oxygen partial pressure of air and at a temperature of between 250° and 500° C.

15. A process according to claim 3, wherein said organic copper compound is in an effective amount of copper between 0.05 and 1% by weight based on the polycarbonate resin and wherein said heating is carried out in an atmosphere having an oxygen partial pressure higher than the oxygen partial pressure of air and at a temperature of between 250° and 500° C.

16. A process according to claim 12, wherein said organic copper compound is in an effective amount of copper between 0.05 and 1% by weight based on the polycarbonate resin and wherein said heating is carried out in an atmosphere having an oxygen partial pressure higher than the oxygen partial pressure of air and at a temperature of between 250° and 500° C.

17. A process according to claim 1, wherein said dihydroxyphenyl alkane is 2,2-bis(4-hydroxyphenyl)propane.

18. A process according to claim 2, wherein said dihydroxyphenyl alkane is 2,2-bis(4-hydroxyphenyl)propane.

19. A process according to claim 13, wherein said dihydroxyphenyl alkane is 2,2-bis(4-hydroxyphenyl)propane.

20. A process according to claim 15, wherein said dihydroxyphenyl alkane is 2,2-bis(4-hydroxyphenyl)propane.

* * * * *

UNITED STATES PATENT AND TRADEMARK OFFICE
CERTIFICATE OF CORRECTION

PATENT NO. : 4,391,955

DATED     : July 5, 1983

INVENTOR(S) : Hisako HORI et al

It is certified that error appears in the above-identified patent and that said Letters Patent is hereby corrected as shown below:

Column 6, line 45:  Replace "5 mm" with --50 mm--.

Column 10, line 63: After "polycarbonate" insert --resin by a impregnation method by means of solvent--.

Signed and Sealed this

Twentieth Day of March 1984

[SEAL]

Attest:

Attesting Officer

GERALD J. MOSSINGHOFF

Commissioner of Patents and Trademarks